United States Patent [19]
Garbin

[11] 3,948,118
[45] Apr. 6, 1976

[54] SAFETY STEERING WHEEL FOR MOTOR VEHICLES

[75] Inventor: Carlo Zucchetti Garbin, Milan, Italy

[73] Assignee: Industria Napoletna Costruzione Autoveicoli Alfa Romeo Alfasud S.p.A., Naples, Italy

[22] Filed: Jan. 3, 1975

[21] Appl. No.: 538,250

[30] Foreign Application Priority Data
Jan. 8, 1974   Italy.................. 19198/74

[52] U.S. Cl................... 74/552; 280/87 R
[51] Int. Cl.²............................ B62D 1/08
[58] Field of Search......... 280/87 R, 150 B; 180/78; 74/492, 552, 558

[56] References Cited
UNITED STATES PATENTS

| 1,476,347 | 12/1923 | Martin | 74/552 |
| 1,677,714 | 7/1928 | Frease | 74/552 |
| 2,182,413 | 12/1939 | Stolpe | 74/552 |
| 2,187,604 | 1/1940 | Husted | 74/552 |
| 3,055,231 | 9/1962 | Daniel | 74/552 |
| 3,321,995 | 5/1967 | Geller | 74/552 |
| 3,726,147 | 4/1973 | Spietz | 74/552 |

Primary Examiner—Kenneth H. Betts
Attorney, Agent, or Firm—Holman & Stern

[57] ABSTRACT

A safety steering wheel for motor vehicles is disclosed, the improvement consisting in that between the steering wheel hub and the wheel rim and spokes assembly a yieldable connection structure is inserted, said structure comprising an annular rib and a central framing in the shape of a lattice work. The stiffness of the component parts of the resilient structure is so designed as to permit a temporary deformation of the wheel assembly so as to spread the impact energy over a surface which is the widest possible.

3 Claims, 4 Drawing Figures

U.S. Patent   April 6, 1976   3,948,118
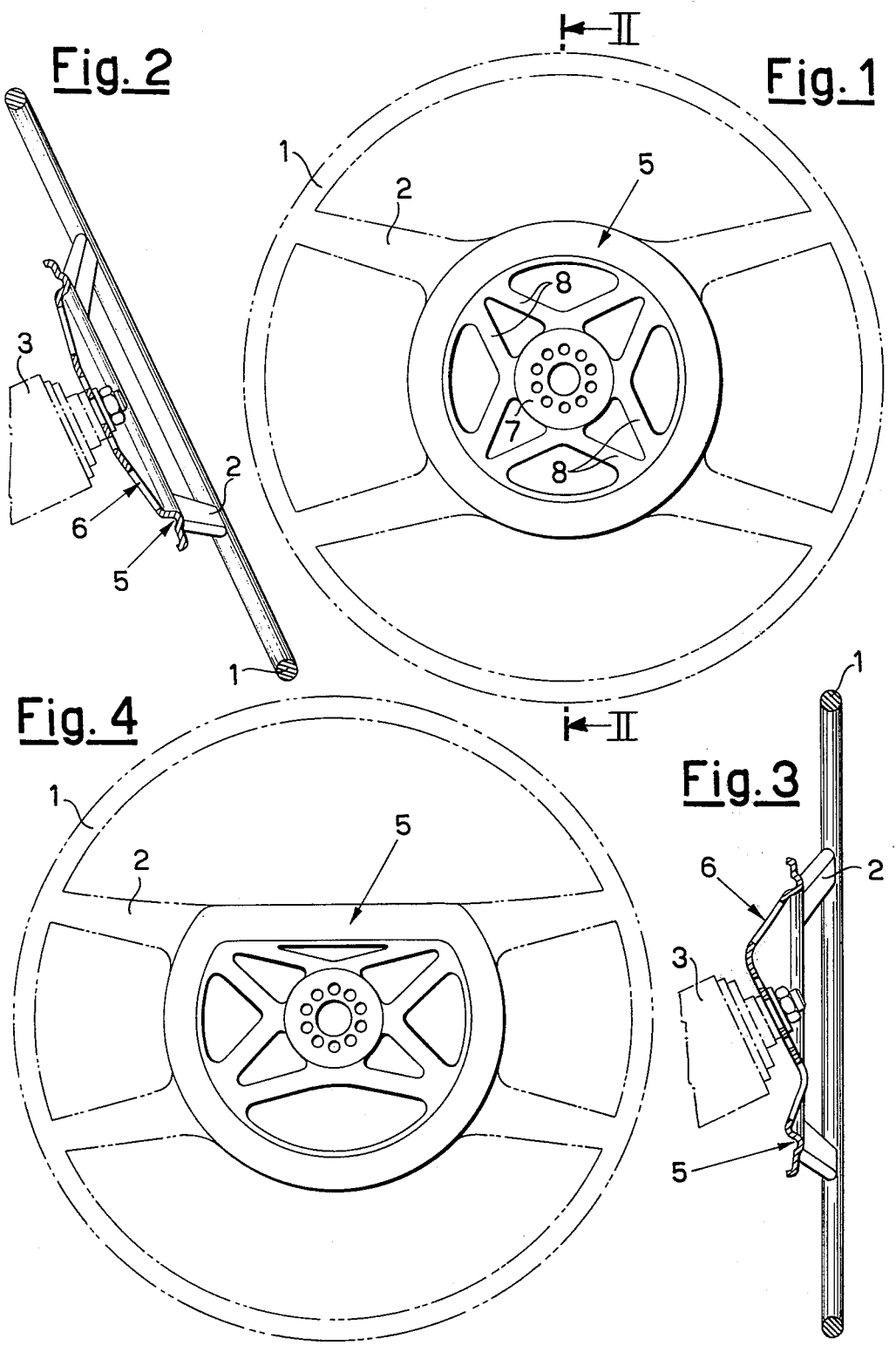

SAFETY STEERING WHEEL FOR MOTOR VEHICLES

This invention relates to a safety steering wheel for motor vehicles which is capable of minimizing the damages to the driver in the case of an accident and possible impact between the steering wheel and the thorax of the driver.

During the impact of a motor vehicle against an obstacle, especially when a front impact is involved, it is known that the driver's body is thrust forward and bumps against the steering wheel, more particularly against a portion of the lower half of the wheel's outer periphery and this because the steering wheels do generally slope more or less forwards.

The shape and the stiffness of the conventional steering wheels are such that the wheel, under the impact of the driver's body is deformed locally in the impact area, to dissipate then the entire residual energy on a limited area of the steering wheel-steering column connection. It thus occurs that, first the wheel and then the column react against the driver's body on very restricted areas, extremely high specific pressures being originated. By so doing, the impact can have a fatal outcome.

An object of the present invention is thus to provide a safety steering wheel for motor vehicles, having such a structure as to limit to a minimum the damages to the driver in the case of an accident and possible impact between the steering wheel and the driver's body.

To achieve this object, according to the invention, it has been envisaged to provide a safety steering wheel, which is characterized in that between the outer rim and spokes assembly and the hub a connection structure is inserted which consists of a peripheral rib having a generally annular configuration and a stiffness which is at least equal to that of the rim-and-spokes assembly, and a central framing having a resistance to bending smaller than that of the assembly as formed by the rim, the spokes, and the rib.

According to a preferred embodiment of the invention, the rib and the framing have a circumferential and a lattice-like configuration, respectively.

When during the impact, the driver bumps against the lower portion of the wheel rim, a steering wheel made according to the invention, on account of its yieldable central framing, rotates about the column until becoming positioned parallelly to the surface of the impact with the driver, so that the impact force is spread over a maximum surface and thus the specific relative pressure through which the column transfers its reaction is at a minimum.

In order that the structural and functional features of the invention may be better understood, along with its advantages over the known art, an exemplary disclosure will now be given, with reference to the accompanying drawings, of two practical embodiments of steering wheels embodying the invention.

In the drawings:

FIG. 1 is a front view of a steering wheel according to the invention.

FIG. 2 is a cross-sectional view taken along the line II—II of FIG. 1, and shows a steering wheel as mounted on a steering column in its working position.

FIG. 3 is a view like that of FIG. 2 but showing the behaviour of the steering wheel in the case of an impact, and FIG. 4 is a front view of another steering wheel according to the invention.

Having now reference to FIGS. 1 to 3 of the drawings, the numeral 1 indicates the outer rim of the steering wheel, 2 are the spokes, in a merely indicative number, and 3 is the steering column. According to the present invention, the steering wheel is mounted on the column through a connection structure consisting of a peripheral annular stiff rib 5 and a yieldable lattice-like framing 6 with a central hub 7. While the shape of the conventional components of the steering wheel (outer rim and spokes) is within the purview of the known art, the rib 5, even though it can have different cross-sectional shapes, should have a stiffness equal to that of the outer rim and the spokes, so that the entire assembly is capable of transferring, without undergoing deformation, the stresses to the framing 6.

The yielding framing 6 is constituted by a suitable number of lattice members 8, so constructed and arranged that the entire framing has the same resistance to twist throughout and a resistance to bending lesser than that of the assembly as formed by the outer rim, the spokes and the annular rib.

Under these conditions, as the driver bumps into the outer rim 1 and transfers a certain load thereto, the load does not appreciably deform the outer rim, the spokes and the annular rib inasmuch as these component parts have a resistance to twist and bending greater than that of the yieldable framing 6, while the latter framing, under the load urge, becomes deformed with respect to the steering column, as shown in FIG. 3. The deformation of the yieldable framing will be over as soon as the intermediate annular rib and the outer rim are set parallel to the surface of impact with the driver, that is, when the resting area is at a maximum.

The rib 5 can have both the circumferential outline as shown in FIG. 1, and the partially circumferential and partially straight outline as shown in FIG. 4.

The lattice work 6 is rigorously symmetrical with respect to the central hub, irrespective of the position of the spokes 2 and of the position of application of the load to the outer rim 1. The frame 6, in addition, has a stiffness which is adequate to transfer the manipulation twist to the steering column, this effect being obtained by arranging, as shown, the resistance members of the lattice work tangentially to the central fastening area of the hub.

What is claimed is:

1. A safety steering wheel for motor vehicles, which minimizes injury to the driver upon impact between the driver and the steering wheel, comprising an outer rim and spokes assembly, a central hub and a yieldable connection structure between said hub and said assembly, said connection structure including a peripheral rib having a generally annular configuration and a stiffness at least equal to that of said rim and spokes assembly and a lattice-like central framing having a resistance to bending less than that of the assembly formed by the rim, the spokes and the annular rib and a stiffness which is symmetrical with respect to said central hub irrespective of the position of the spokes and the point of impact on the outer rim, the members making up said lattice-like central framing being, each, tangent to said control hub.

2. A steering wheel according to claim 1, wherein said rib has a circumferential outline.

3. A steering wheel according to claim 1, wherein said rib has a partially circumferential and a partially rectilinear configuration.

* * * * *